United States Patent [19]

Kitamura et al.

[11] 4,024,661
[45] May 24, 1977

[54] SELF-STANDING OR PHONE MOUNTED CALENDAR

[76] Inventors: Keiji Kitamura, No. 6-60-407, 1 chome, Nishimiyahara, Yodogawa, Osaka, Japan, 532; Yasuko Furutuki, No. 1156, 2-chome, Venoshiba-Mukaigaoka, Sakai, (Osaka), Japan, 593

[22] Filed: Mar. 31, 1976

[21] Appl. No.: 672,549

[52] U.S. Cl. .................................. 40/337; 40/107; 40/124.1; 40/120

[51] Int. Cl.² ...................... G09F 3/00; G09F 1/00; G09D 3/04

[58] Field of Search .... 40/107, 120, 336, 337–339, 40/124.1

[56] References Cited

UNITED STATES PATENTS

| | | | |
|---|---|---|---|
| 622,289 | 4/1899 | Stevens | 40/124.1 X |
| 1,874,201 | 8/1932 | Mathers | 40/107 |
| 3,469,336 | 9/1969 | Halperin | 40/336 |

FOREIGN PATENTS OR APPLICATIONS

| | | | |
|---|---|---|---|
| 627 | 9/1907 | United Kingdom | 40/124.1 |

*Primary Examiner*—E. H. Eickholt
*Attorney, Agent, or Firm*—Browdy and Neimark

[57] ABSTRACT

A conventional calendar for a dial telephone instrument is improved so that it may be used alternatively either as a calendar which is to be associated with a conventional telephone instrument or stood on a desk or the like. In case the calendar is to be associated with a telephone instrument, a disc portion is removed from a sheet and placed in the central portion of the dial of a telephone instrument. In case the calendar is to be free standing, the upper portion of its peripheral part is bent backwardly to form a supporting leg.

6 Claims, 5 Drawing Figures

U.S. Patent
May 24, 1977
4,024,661
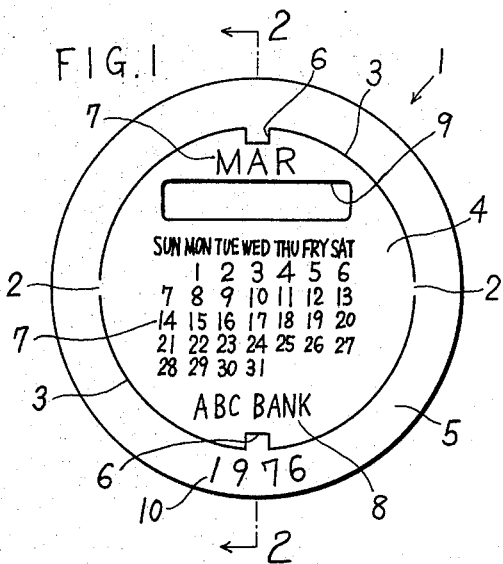
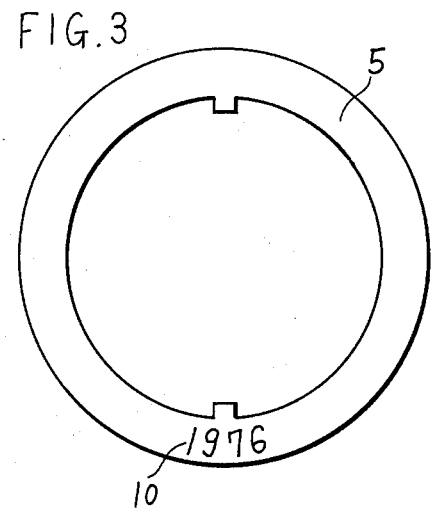
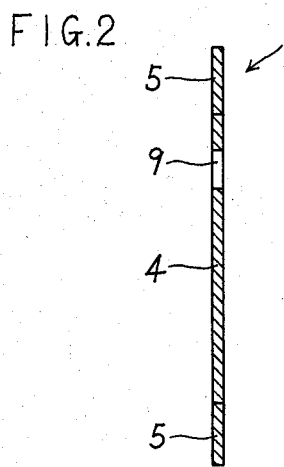
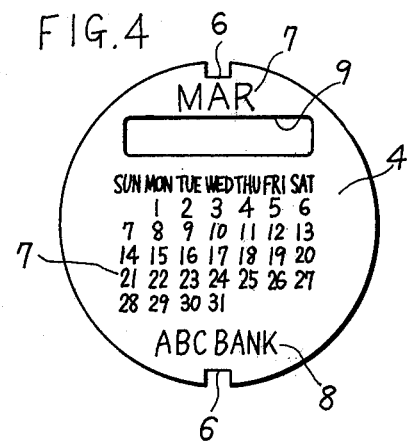
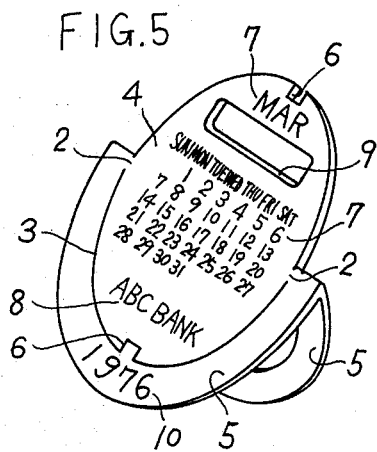

SELF-STANDING OR PHONE MOUNTED CALENDAR

BACKGROUND OF THE INVENTION

This invention relates to a calendar which is adapted for either on the central portion of a dial of a telephone or standing, inclined, on desk.

The calendar which has been used hitherto, in place on the central portion of a dial of a telephone has been printed with letters and numbers on a sheet positionable on the central portion of a dial of a telephone, an aperture being provided for writing or viewing a telephone number.

With the above-mentioned calendar, one can confirm the date and the telephone number written on a paper under the calendar through the aperture, on telephoning. However, such calendar cannot be used, suitably stood on desk.

An object of this invention is to provide a conventional calendar alternatively usable as a calendar for a dial telephone or in place on a desk or the like.

BRIEF DESCRIPTION OF THE DRAWING

FIG. 1 is an elevational view of a calendar according to an illustrated embodiment of the present invention.

FIG. 2 is a cross-sectional view taken on line 2—2 of FIG. 1.

FIG. 3 is an elevational view of peripheral part of the calendar of FIG. 1.

FIG. 4 is an elevational view of calendar part.

FIG. 5 is a perspective view of the calendar of FIG. 1 showing usage on a desk.

DETAILED DESCRIPTION OF THE PREFERRED EMBODIMENT

Numeral 1 is a disk-shaped sheet. The sheet 1 is provided with upper and lower nearly semicircular cut lines 3, 3, opposed each other with two narrow connecting points 2, 2 so as to form a nearly circular cut line. The sheet 1 is divided by the cut line 3, 3 into an almost disk-shaped calender part 4 and a ring-like peripheral part 5 which surrounds the calendar part 4 and is connected to the calendar part 4 by the connecting points 2, 2. The top and bottom of the calendar part 4 have cut-outs 6, 6 to fit projections of the central portion of a dial telephone.

The surface of the calendar part 4 is printed calendar letters and numerals 7, 7 and advertising letters 8. The calendar part 4 is provided with an aperture 9 for writing telephone number on a sheet below. The lower portion of the peripheral part 5 is printed suitable letters 10.

In the embodiment as shown in the drawing figures, the sheet 1 is circular, but the sheet 1 may take polygonal shapes such as square and other geometrical shapes.

The sheet 1 may be made of paper, plastics, metal, etc, as material on, which can be printed letters. The calendar numerals and letters 7, 7, advertising letters 8, and letters 10 are printed on one side or both sides of the calendar part 4 and on the peripheral part 5.

The calendar of this invention comprises the almost disk-shaped calendar part 4 which is defined by upper and lower substantially semi-circular cut lines 3, 3, opposed each other with two narrow connecting points 2, 2 on the suitably shaped sheet 1, and can be put in the central portion of the dial of a telephone. The peripheral part 5 which surrounds the calender part 4 is connected to the calendar part 4 by the connecting points 2, 2, one side or both sides of the calendar part 4 being printed calendar numerals and letters 7, 7. The calendar part 4 is provided with an aperture 9 for writing or viewing a telephone number.

In case that the calendar is intended to be used as a calendar for a dial telephone, the connecting points 2, 2 of the sheet 1 are cut to continue the cut lines 3, 3 so that they join each other and the sheet 1 is divided into the calendar part 4 and the peripheral part 5, as shown in FIG. 3 and FIG. 4. The metal fitting of the central part of the dial of a telephone is removed. A paper of the same size as the calendar part 4 is placed on the central portion of the dial, the calendar part 4 is put on the paper, and then the metal fitting is fitted again. A telephone number is written on the paper, visible through the aperture 9. When the a calendar part 4 in use becomes out-dated, the calendar part 4 alone may be changed for the new one, the above-mentioned paper remaining in place.

In case that the calendar is intended to be used stood on a desk or the like, the upper portion of the peripheral part 5 above the connecting points 2, 2 is bent backward, as shown in FIG. 5. Thus, the portion of the peripheral part 5, bent backward forms a supporting leg so that the calendar can be stood on desk or other suitable places.

The calendar of this invention can be used as calendar for a dial telephone as well as as a calendar, stood on desk or the like.

What is claimed is:

1. A calendar device which is capable for use alternatively as a calendar which may stand on a flat surface and as a calendar which can be associated with a dial of a telephone, the device comprising a sheet having a substantially disc-shaped calendar part including means for fixing said calendar part on the central portion of a dial of a telephone and a peripheral part, which is positioned radially outward from said calendar part; at least two cut lines nearly surrounding said calendar part and separating same from said peripheral part; at least two connecting points free of cut lines which connect said peripheral part to said calendar part, the upper portion of said peripheral part above said connecting points being bendable backward to form a supporting leg for standing the device on a flat surface; and an aperture in said calendar part through which a telephone number may be viewed when said calendar part is removed from the peripheral part and is in place centrally on a dial of a telephone, said calendar part having calendar numerals and letters thereon.

2. A calendar device according to claim 1, wherein said means for fixing said calendar part to the central portion of a dial of a telephone, comprises at least a portion of said calendar part adjacent said cut lines.

3. A calendar device according to claim 2, wherein said calendar part is provided with at least one cut-out to fit at least one corresponding projection of the central portion of a dial of a telephone.

4. A calendar device according to claim 3, wherein said at least one cut-out is a plurality of cut-outs to fit a plurality of corresponding projections of the central portion of a dial of a telephone.

5. A calendar device according to claim 4, wherein said cut-outs are two in number.

6. A calendar device according to claim 5, wherein said cut-outs are located opposite one another.

* * * * *